Figure 36:
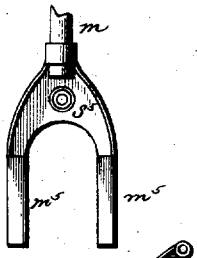

10 Sheets—Sheet 1.

G. M. PETERS.

CARTRIDGE LOADING MACHINE.

No. 10,966. Reissued Nov. 13, 1888.

Witnesses

Wm. F. Sheiden.

William H. McGovern.

Inventor,

G. M. Peters.

By his Attorney J. H. MacDonald.

10 Sheets—Sheet 2.

G. M. PETERS.

CARTRIDGE LOADING MACHINE.

No. 10,966. Reissued Nov. 13, 1888.

Witnesses.

William H McGown

Inventor.

G. M. Peters.

By his Attorney J. H. MacDonald

10 Sheets—Sheet 3.

G. M. PETERS.

CARTRIDGE LOADING MACHINE.

No. 10,966. Reissued Nov. 13, 1888.

Witnesses,
Geo. E. Spindler.
William H. McGown.

Inventor,
G. M. Peters.
By his Attorney J. H. MacDonald.

G. M. PETERS.

CARTRIDGE LOADING MACHINE.

No. 10,966. Reissued Nov. 13, 1888.

Witnesses,

Wm. L. Seidem.

William H. McGown.

Inventor,

G. M. Peters.

By his Attorney J. H. MacDonald

G. M. PETERS.

CARTRIDGE LOADING MACHINE.

No. 10,966. Reissued Nov. 13, 1888.

Witnesses.

William H. McGown.

Inventor,

G. M. Peters.

By his Attorney - J. H. MacDonald.

G. M. PETERS.

CARTRIDGE LOADING MACHINE.

No. 10,966. Reissued Nov. 13, 1888.

Witnesses.

Wm. J. Sheidow

William H. McGown.

Inventor.

G. M. Peters.

By his Attorney D. H. MacDonald.

G. M. PETERS.

CARTRIDGE LOADING MACHINE.

No. 10,966. Reissued Nov. 13, 1888.

Witnesses.

Wm. G. Seiden.

William H. McGown,

Inventor,

G. M. Peters.

By his Attorney J. H. MacDonald

G. M. PETERS.
CARTRIDGE LOADING MACHINE.
No. 10,966. Reissued Nov. 13, 1888.
Fig. 26.
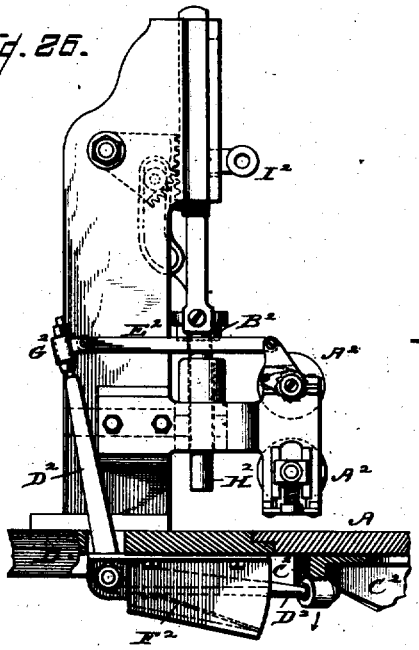
Fig. 27.
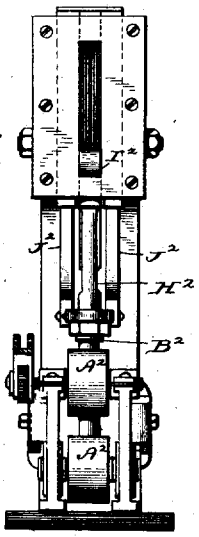
Fig. 28.
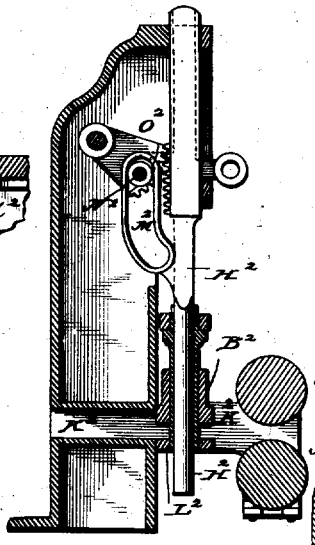
Fig. 29.
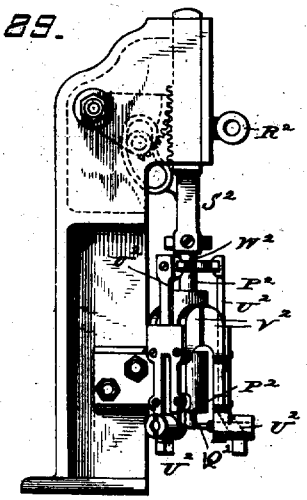
Fig. 30.
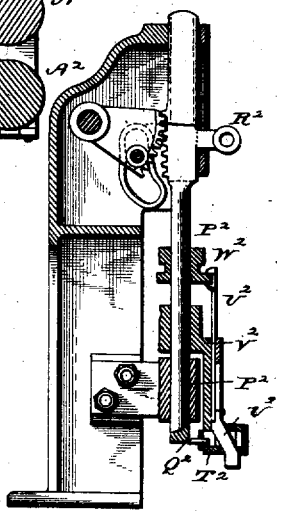
Fig. 31.
Fig. 32.
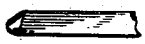
Witnesses,
Wm. L. Sheidem,
William H. McGown,
Inventor,
G. M. Peters,
By his Attorney J. H. MacDonald,

G. M. PETERS.

CARTRIDGE LOADING MACHINE.

No. 10,966. Reissued Nov. 13, 1888.

Witnesses.

William H. McGown

Inventor.

G. M. Peters.

By his Attorney J. H. MacDonald.

G. M. PETERS.

CARTRIDGE LOADING MACHINE.

No. 10,966. Reissued Nov. 13, 1888.

Witnesses,
Wm. L. Sheidem.
J. Thomson Cross

Inventor,
G. M. Peters.
By his Attorney, J. N. MacDonald

UNITED STATES PATENT OFFICE.

G. MOORE PETERS, OF CINCINNATI, OHIO.

CARTRIDGE-LOADING MACHINE.

SPECIFICATION forming part of Reissued Letters Patent No. 10,966, dated November 13, 1888.

Original No. 360,043, dated March 29, 1887. Application for reissue filed September 15, 1888. Serial No. 285,559.

*To all whom it may concern:*

Be it known that I, G. MOORE PETERS, a citizen of the United States, residing at Cincinnati, in the county of Hamilton and State of Ohio, have invented certain new and useful Improvements in Cartridge-Loading Machines; and I do hereby declare that the following is a full, clear, and exact description of the invention, which will enable others skilled in the art to which it appertains to make and use the same, reference being had to the accompanying drawings, forming a part of this specification.

My invention relates to improvements in machines for loading cartridge-shells.

The device consists, primarily, of a circular table peculiarly actuated and revolving within a stationary table, the revolving table being provided with the shell-holding cases, the filling device being supported by the stationary table.

The tables, filling devices, and means for actuating them will be hereinafter more fully described, and shown in the accompanying drawings, in which—

Figure 10:
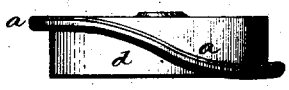
Figure 11:
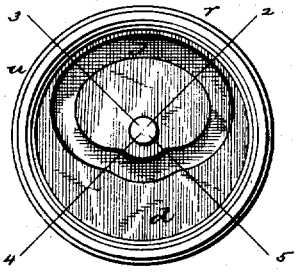
Figure 1:
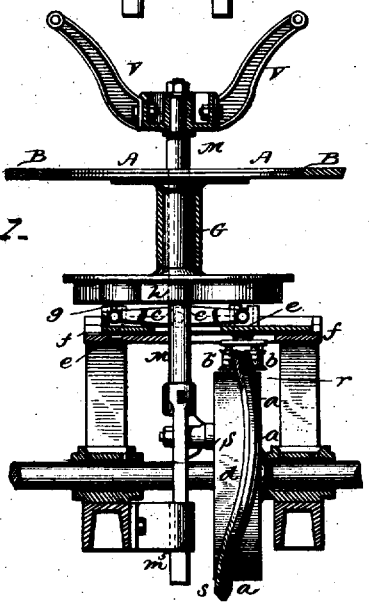
Figure 18:
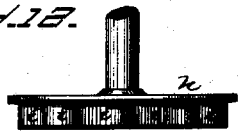
Figure 13:
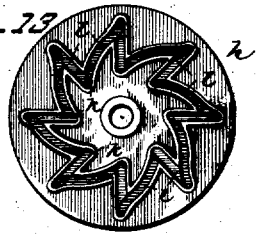
Figure 1A:
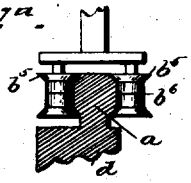
Figure 37:
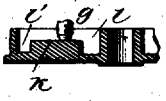
Figure 2:
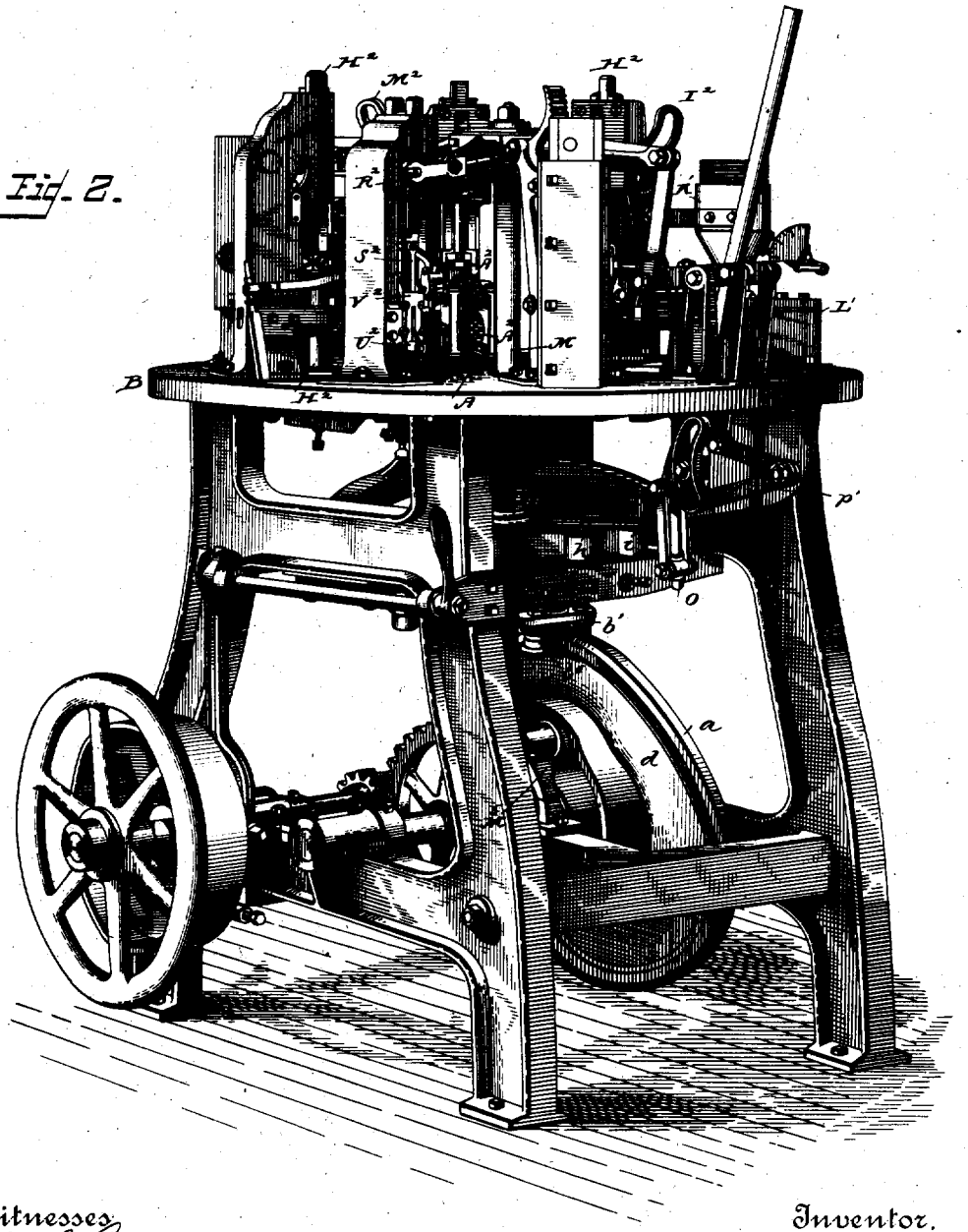
Figure 2:
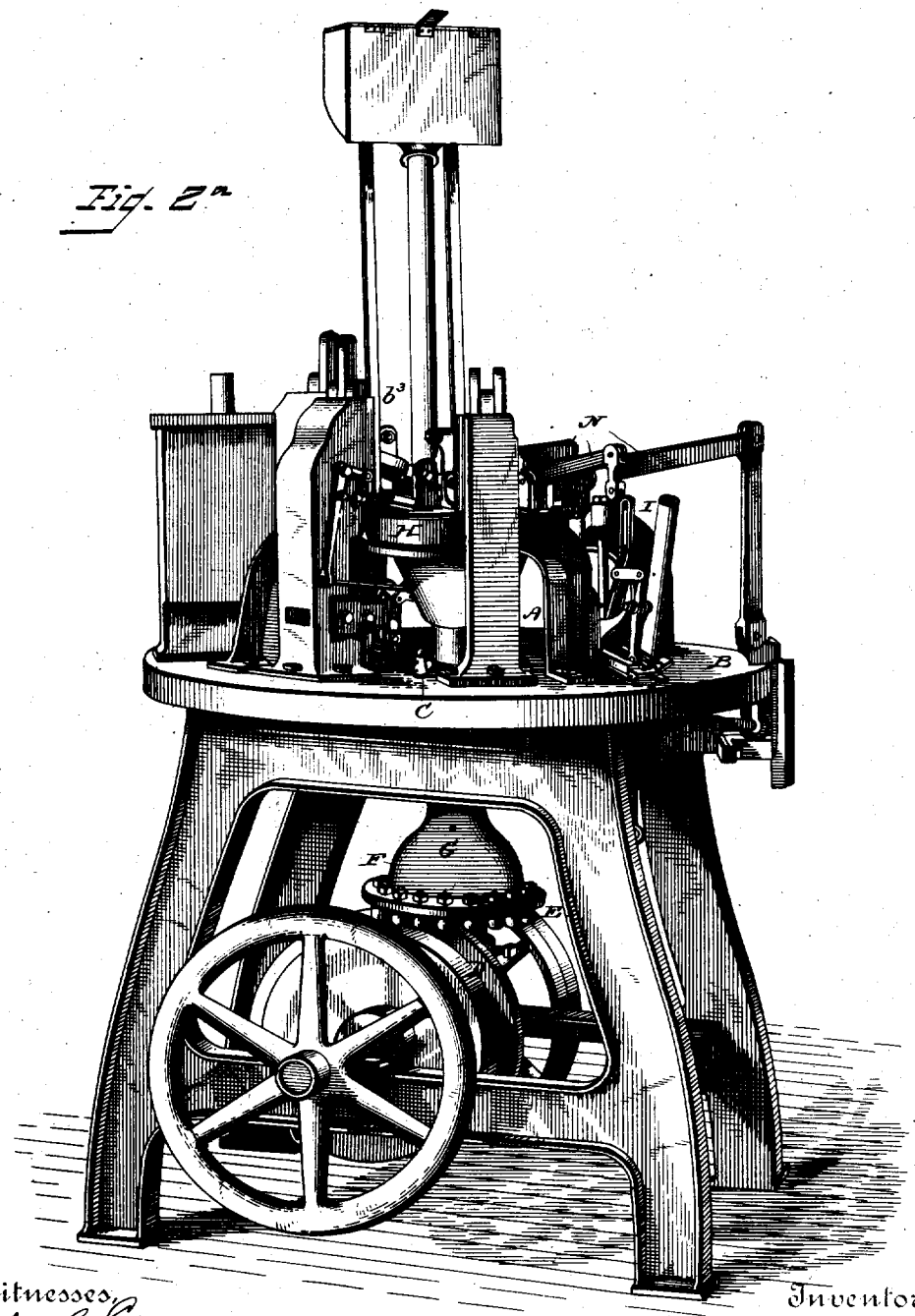
Figure 3:
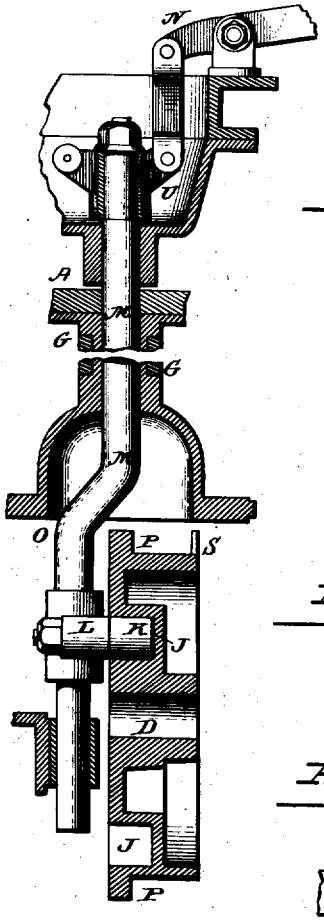
Figure 4:
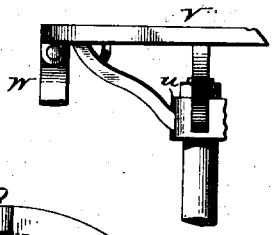
Figure 9:
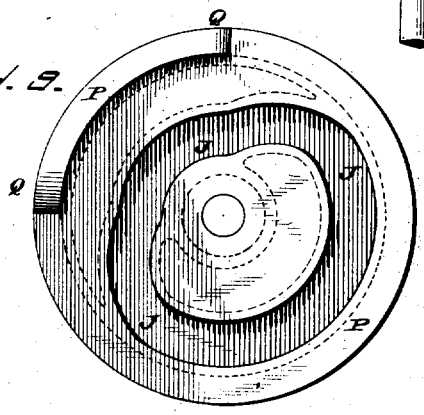
Figure 5:
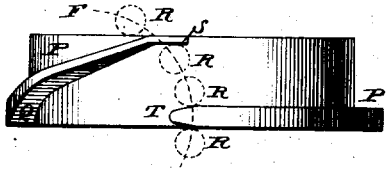
Figure 6:
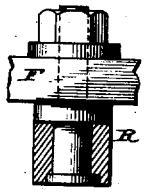
Figure 7:
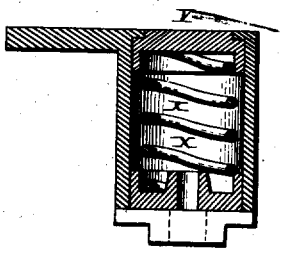
Figure 8:
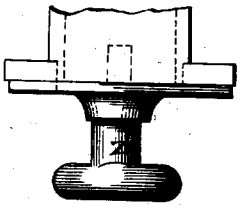
Figure 14:
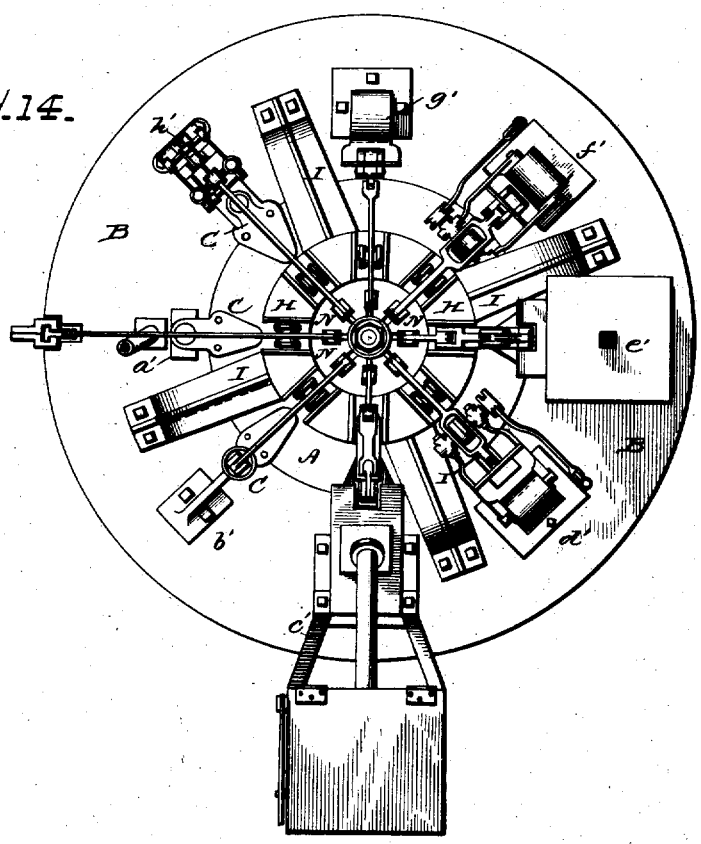
Figure 18:
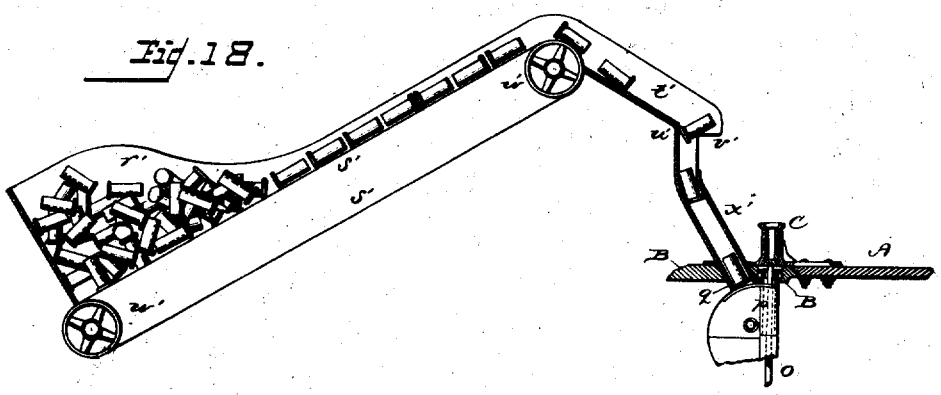
Figure 16:
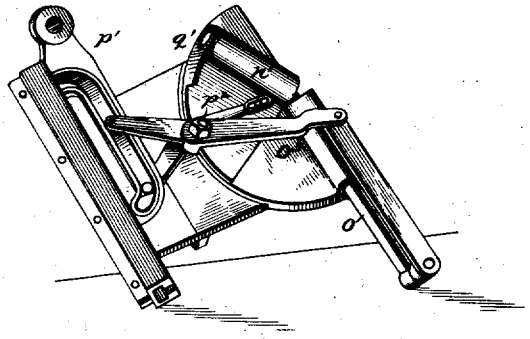
Figure 17:
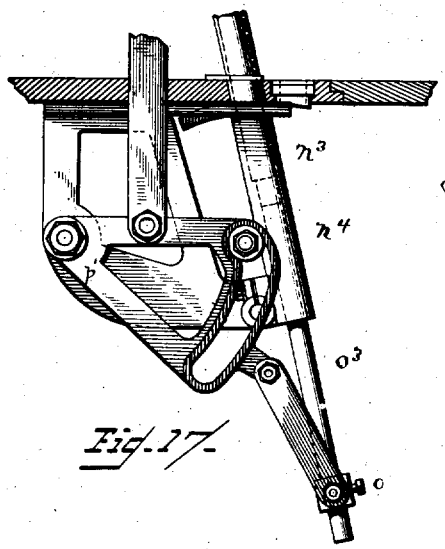
Figure 15:
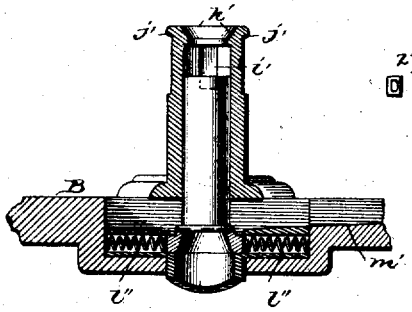
Figure 19:
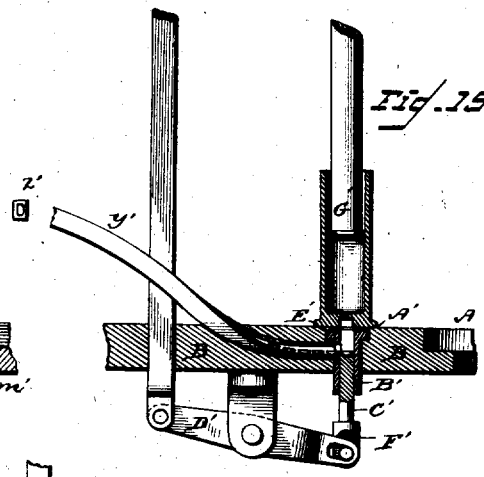
Figure 20:
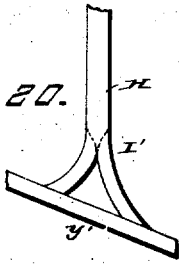
Figure 21:
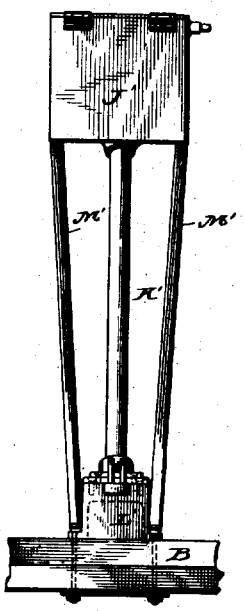
Figure 25:
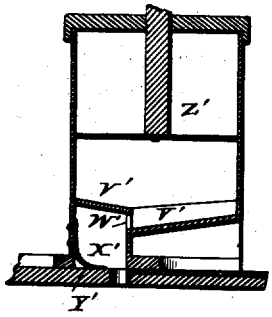
Figure 24:
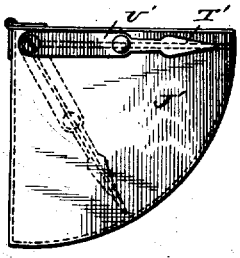
Figure 34:
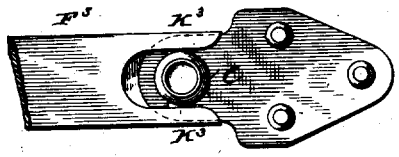
Figure 33:
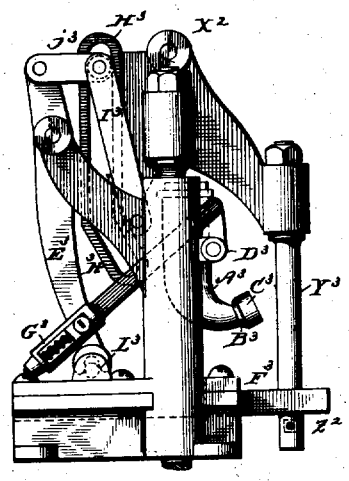
Figure 35:
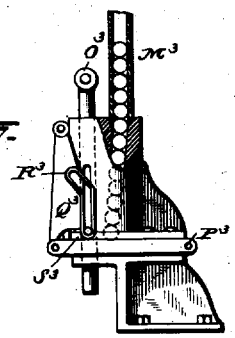
Figure 38:
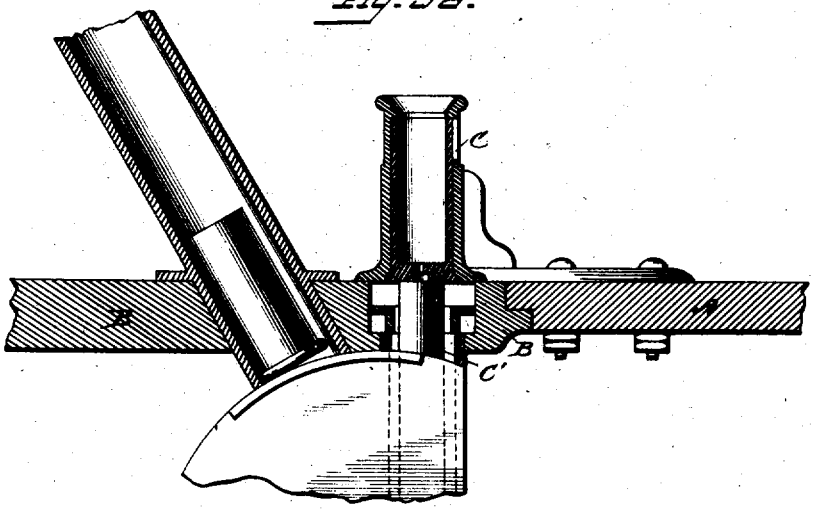
Figure 39:
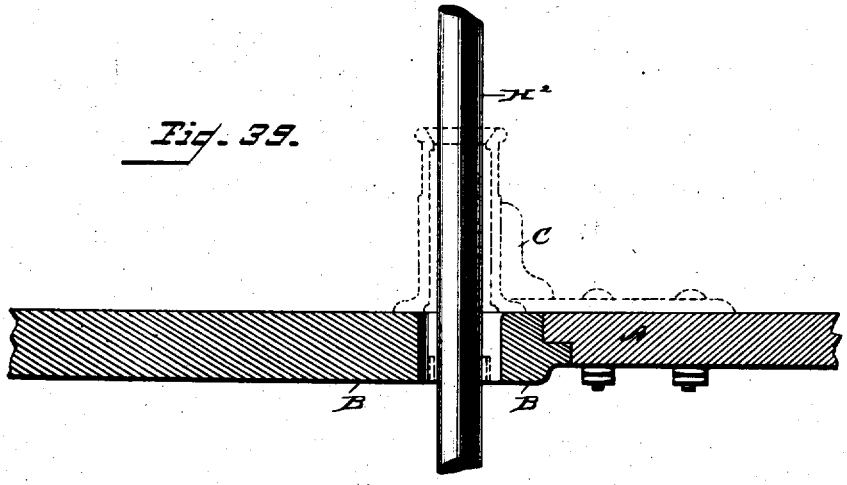

Figure 1 is a vertical section of my device; Fig. 1ª, a detail cross-section through the cam-wheel and rollers; Fig. 2, a perspective view of the device and its supports. Fig. 2ª is a perspective view of a modification of the central-shaft connections with the loading devices; Fig. 3, a vertical section of a modified form of shaft for actuating the filling devices; Fig. 4, a detail side view of a modification in the method of connecting the actuating-shaft with the wad-cutting and filling devices, the radiating levers being dispensed with; Fig. 5, a side elevation of a modification of the spiral flange on the cam-wheel; Fig. 6, a detail view of one of the rollers bolted to a circular plate or flange on the hollow shaft; Fig. 7, a vertical section of supports for shells while the wads are being rammed; Fig. 8, a side elevation of the same, showing means of adjustment for regulating the pressure; Fig. 9, a plan of the modified cam-wheel; Fig. 10, a side elevation of the cam-wheel for actuating the central shaft; Fig. 11, a plan view of the same; Fig. 12, a side elevation of wheel for rotating the movable table; Fig. 13, a bottom plan view of same; Fig. 14, a top plan view of the machine; Fig. 15, a vertical section of one of the shell-cases with a shell partially inserted; Fig. 16, a detail perspective view of a modification of the shell-placer removed from the machine; Fig. 17, a side elevation of the shell-placer and actuating mechanism; Fig. 18, a longitudinal section of the feeding device for conducting the shells to the placer; Fig. 19, a vertical section of the capping device; Fig. 20, a top view of the cap-separator; Fig. 21, a front elevation, and Fig. 22 a side elevation, of the powder-loading device; Fig. 23, a section of the slide for receiving and discharging the powder into the shell; Fig. 24, a detail side view of the powder-gage; Fig. 25, a vertical section of the shot-hopper; Fig. 26, a side view of one of the wad cutters and placers; Fig. 27, a front view of the same; Fig. 28, a vertical section of same; Fig. 29, a side view, and Fig. 30 a vertical section, of the indenting device; Figs. 31 and 32, enlarged detail views of the indenting-points; Fig. 33, a side view of the shell-extractor and upper wad-printing mechanism; Fig. 34, a top plan view of the shell-case clamp and clutch; Fig. 35, a side view, partly in section, of the device for filling and compressing ball-cartridges; Fig. 36, a side view of the forked extension of the actuating-shaft, and Fig. 37 a cross-section of the wheel for rotating the movable table. Fig. 38 is a section at the shell-placer, showing the opening in the stationary table and the shell-holder projecting over the opening therein; Fig. 39, a section at the shell-extractor, showing the opening in the stationary table, the cartridge-holder secured to the movable table, and the ejector passing through the shell-holder.

The object of my device is to readily and rapidly fill and cap cartridge-shells by continuous and automatic movements.

There have been devices heretofore used in which the shells have been loaded from receptacles containing powder, shot, and wads. In these devices the wads have been first cut and then placed in receptacles, and then fed into the shells from said receptacles. In my device the pasteboard, felt, or wad material is fed from a strip wound on rollers and automatically cut and rammed or pressed into the shell, thus saving time and labor in their replacement and economy in first cost of material.

To attain these ends I have constructed the device here illustrated, and which consists, generally, of two principal parts—viz., a circular stationary table, B, supporting the various filling devices, and a revolving table, A, carrying the cases which hold the shells while they are being borne from point to point. These tables are supported by any suitable stand, such as shown in Fig. 2. The movable table A is rotated by means of a cam-wheel, *d*, turned by a suitable pulley, E, connected with any power device. This cam-wheel accomplishes the twofold purpose of turning the revolving table and operating the filling devices.

In Fig. 1 there is shown the means for rotating the movable table A. The central shaft, M, is connected to the cam-wheel *d* by an arm, $s^5$, and has two forked extensions, $m^5$, on either side of the shaft and guided in grooves of the bearings for the motor-shaft. The shaft M is perfectly straight and rises directly in line with the center of the cam-wheel *d*. It will be seen that the cam *j*, Fig. 11, which lifts and lowers the shaft M, is essentially the same as shown in Figs. 2 and 9, except that it is in the reverse position as related to the cam for moving the table. In this instance an unbroken spiral flange, *a*, operates the table. This flange is embraced by two ball-rollers, *b*, connected with the arm *c*, which rests in and is pivoted to a sliding frame, *e*, which has horizontal bearings in *f*. In the middle portion of arm *c*, and sliding frame *e*, and running lengthwise, there is a slot through which the shaft M freely passes, and of sufficient extent to permit said parts to move back and forth without striking the shaft. On the outer end of the arm *c* there is a small roller, *g*, which plays in grooves in wheel *h*, (which is solidly secured to shaft G, and therefore to table A,) causing it to start and stop in its revolution as the spiral flange *a* revolves the sliding frame *e* (or the arm *c*) back and forth. A bottom plan of the grooves in wheel *h* is shown in Fig. 13.

In Fig. 12 the wheel is in its proper position, and shows more clearly the flanges inclosing the grooves. The grooves *k* are straight and point toward the center as radii. These grooves are employed to hold the table stationary while the filling and wad-cutting devices are in operation, the small roller *g* occupying them for three-quarters of the revolution of *d*. The curved grooves *l* are employed to move the table. The roller *g* moves outward from the center along *k* and back toward *l*. The roller, moving rigidly in a straight line through the diameter of *h*, forces the wheel *h* or the table A around one-eighth of its revolution. The question here arises, How shall we prevent *g* from returning in *k*, or how shall we compel it to take groove *l*? This is accomplished by the shape of the grooves and the pivoted frame of the arm *c*, hereinafter to be described.

The curved grooves *l*, which cause the movement of the table, are greater in depth than the straight groove *k*, thus affording an unbroken curve throughout their length. When the roller *g*, by means of the ogee curve or flange *a*, lying between radii 2 and 3, Fig. 11, reaches the inner end of the groove *l*, it is lifted by the action of flange *a* and operating-rollers *b* sufficiently to pass into *k*, where it is moved outwardly along *k* by the ogee portion of the flange between radii 4 and 5. On reaching the outer end of *k* it is again thrown up into *l* by the portion of the flange between radii 4 and 1, when the operation is again repeated. The flange *a* of wheel *d* is beveled to engage the flanges $b^5$ of the rollers. The rollers *b* are cut in two or horizontally at $b^6$, so as to avoid friction. The upper portion of the flange *a* being farther away from the center of the wheel than the lower portion, it will travel faster than the lower portion, and in order to provide for the excess of motion of the upper portion of the rollers they are cut away horizontally, as at $b^6$. The object of the flanges impinging against the bevels of the flange is to produce a perpendicular movement for engaging and disengaging roller *g* from the curved slots *l*, as before described. This is accomplished by means of the flange *a* moving out from and in toward the center of the wheel *d* at the proper points in its revolution.

From radii 2 to 3 the rollers *b*, embracing the flange, move the table one-eighth of a revolution while the filling devices are in momentary suspense, and then from 3 to 4 the rollers one inch, causing the arm *c* to tilt and throw down its outer end containing roller *g*, and this takes roller *g* out of the deepest portion of the curved slot *l*, and while this is being done the rammers are entering and the devices are being operated by the downward stroke. From 3 to 5 the ogee part of the flange moves the sliding frame *e* with the arm *c* outward, carrying the roller *g* through the shallow straight slot *k*. At the same time the filling devices are all held stationary at the bottom of the stroke, the rammers being within the shells. From 5 to 1 the rollers *b* are caused to descend one inch toward the center, causing *g* to rise up into the next curved slot *l*. At the same time the filling devices are carried up to the top of the stroke. These movements will be found to be smooth, positive, and easily performed, and the device for effecting them is simple and easy of operation. It is evident that table A may be operated by means of a ratchet on the under side, or by means of eccentric gearing; but in none of these movements can there be the same positiveness, accuracy, and freedom from jar as in the method just described.

In the loading of shotgun-shells eight distinct devices are employed, and these devices have motion imparted to them by the mechanism just described.

By referring to Fig. 14, $a'$ is the shell-placer, where the shell is put into the case C and started on its round. $b'$ is the capper; $c'$, the powder-loader; $d'$, the cutter and placer of the felt wad; $e'$, the shot-loader; $f'$, the cutter and placer of the pasteboard wad; $g'$, the indenter, and $h'$ the extractor of the loaded shell. I will now describe in succession and order each of these several devices.

In Fig. 15 there is shown a sectional view of one of the eight shell-cases in the act of receiving a shell. These cases are bolted to the revolving table A, with the part for holding the shell reaching over the stationary table B and resting nearly upon it, there being just room to escape friction. These cases are made to fit closely about the shell, and are provided with a seat for the flange. They are open at the bottom, and the shells are shoved into them from beneath, as into the breech of a gun. Two or more slots, $i'$, arranged at equal distances around the case and extending from near the top to one-third or more of the distance downward, afford openings for the passage of indenting-points to make indentations for holding the load in place. On the inside, extending around the top, is a slight projection, $j'$, for the purpose of protecting the edge of the shell.

In order to aid in guiding the powder and shot, and also in compressing the wads to fit the shell, the top of the shell-case is made flaring or beveled, as at $k'$. The shell is shoved up into the case through an opening in the table B, and is held in place until the case is moved away from the opening by means of spring-catches $l''$, which fly together the moment the flange of the shell passes them. An incline, $m'$, (with one-eighth of an inch or more fall,) is provided to shove the shell up as the case is moved forward should the placing device from any cause fail to accomplish its full stroke.

The shell-placing device (shown in Fig. 16) receives the shell from the feeder. The pocket $n'$, which receives the shell at an angle, is made to swing on a pivot in a perpendicular direction. When the shell enters the pocket, it is moved forward into an erect position. Then the bolt or piston $o'$ is shot forward, carrying the shell into the case, which stands over it. These two movements are accomplished by means of the sliding cam-lever $p'$, (which is connected with one of the radiating levers.) The stroke being downward, the first effect is to move the lever $o^2$, operating the pocket $n'$, and then holding it still while the lever $o^3$, connecting with the bolt $o'$, is moved. This action may be obtained in a variety of ways.

In Fig. 17 the pivot $n^3$ and the socket $n^4$, containing the bolt or piston $o^3$, may be one continuous piece and be pivoted at the bottom of the socket $n^4$ at $n^5$. The bolt $o^3$ in this instance is not operated by a cam, but by continuous movement of the cam-lever $p^3$, the starting point of the bolt being sufficiently low for it not to strike the shell until the piece $n^3$ $n^4$ is brought into an erect position. This is accomplished in the following manner: The lever $p^3$ contains a cam-slot, $q^3$, which is eccentric at its upper portion, while the lower portion conforms to the pivot of $p^3$ as its center. In this cam slot plays the roller $r^3$, connected with the piece $n^3$ $n^4$. As the lever $p^3$ is moved upward, its effect is first to lift $n^3$ $n^4$ into a vertical position and then to hold it in this position while the bolt $o^3$ shoves the shell into the case. The throw of the bolt $o^3$ is regulated by the adjustable collar $o^4$, held in place by a set-screw. There may be other ways devised for effecting these movements; but the one just described is regarded as preferable. While the pocket $n^3$ is in position for receiving the shell from the feeding-tube it is practically a continuation and part of it, and as it is thrown forward into an erect position it leaves the bottom of the tube open, and naturally all the shells would drop out. To prevent this a flange or cut-off, as $q^4$, (see also $q'$, Fig. 16,) is attached to the pocket $n^3$ and moves forward with it to close the bottom of the tube, the pocket being just deep enough to receive one shell. The shells are thrown promiscuously into a hopper, $r'$, and are conducted (the proper end foremost) to the placer. The hopper is widespread at the top, but contracts toward the bottom to nearly the width of the diameter of the shell, and finally terminates in a long narrow trough tilted at an angle of about forty-five degrees. An endless belt, $s'$, runs along the narrow bottom of the hopper, drawing the shells along lengthwise one by one and depositing them in the narrow descending trough $t'$, down which they slide endwise. With some shells the butts will be foremost, and with others the reverse. The object now is to turn these latter, so that all shall go down with butts foremost, and so enter the pocket $n'$. This is accomplished by gravity and the peculiar construction of the feed-tube. The butt-end being much the heavier, it will go down first if the shell can be brought on a pivot near the middle. To effect this an opening is made in the bottom of the trough $t'$ near its lower end, as at $u'$, less in width than the length of a shell. This forms a shoulder, $v'$, at this point. Now the shells, coming butt foremost, will naturally tilt immediately on coming to the opening and continue down. Those the reverse will pass on over the opening until the tip rests on the opposite side, and the butt is permitted to drop in the opening first, as shown in the drawings. I will, preferably, have several such openings on the way from the hopper to the shell-placer. The pulley $w'$, for carrying the belt $s'$, may be run in connection with the shaft which turns the cam-wheel D. The shells before reaching their terminus pass into a narrow tube, $x'$, having a diameter but little larger than the shells, in order that they may be guided accurately into the pocket $n'$, in which they closely fit. As before stated, as soon as a shell enters the pocket $n'$ it is erected, the guard $q'$ is moved forward with it so as to cut off the feed, the piston forces it upward into the placer, and when it descends again the table moves to the right to the capper and a new shell-case is presented for another shell.

The caps are fed to the capper by means of a conductor, $y'$, Fig. 19, in such a way as to bring them into position one at a time. The caps start on their edge, as at $z'$, and roll down in that way till near the bottom, when, by a twist in the passage, they are turned over on their backs or solid ends. At A′ they enter, one at a time, through an opening in the side of a perpendicular tube, B′, and rest on the top end of the bolt or piston C′. The piston is shoved upward by means of the lever D′, which, as in the instance of the other operating devices, is connected with a lever, N. The cap is thus shoved into the seat provided for it in the base of the shell, which stands immediately over it, as here shown. The tube B′ is set somewhat loosely in the stationary table B, and is capable of being moved up and down. On the top part of this tube, as at E′, is a die set with the initial letters of the shell company, the size or gage of the shell, and the size of the shot. As the piston C′ passes upward, its shoulder F′, pressing against the bottom of the tube, causes it to make impressions of its letters or numbers on the base of the shell. There may also be a chisel or analogous projection to compress the base about the primer. To afford a firm resistance to this upward pressure, a piston, G′, is made to descend on the inside of the shell by means of the same lever N and press down against the bottom while the piston C′ is passing upward.

The caps are taken from a hopper by means of a belt, (as in the case of the shells;) only in this case the belt is of thick leather with perforations large enough to receive a cap edgewise. They are thrown one after another into the narrow trough H′, Fig. 20, and roll down toward $y'$. Being heavier on one side than the other, as they come down to the dividing-ridge at I′ they tilt on one side or the other, according to the weight, and, curving away on either side in opposite directions, enter the trough $y'$ exactly the same, with the solid sides all facing one way.

The shell having been capped, it is turned to the powder filler or loader. This consists, first, of a hopper, J′, containing the powder, and a tube, K′, (preferably of gun-metal,) for connecting the hopper with the feeding apparatus L′. The hopper is supported by rods or braces M′, Figs. 21 and 22. The object of thus elevating the hopper is to carry it above the heads of the workmen, thus enabling them to escape harm should an accident occur.

Great care is taken to provide against explosions of the powder, all bearings being made of iron or brass, so as to avoid sparks generated by friction. If, perchance, there should be an explosion, the gases will pass out through the tube K′. It is preferable to have the hopper J′ in a room adjacent to the machine, the pipe K′ passing through a partition, so that the force of an accidental explosion will be away from the operating device.

Figure 22:
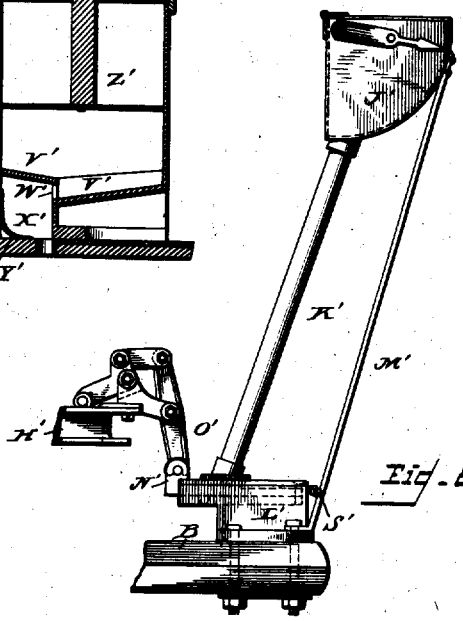
Figure 23:
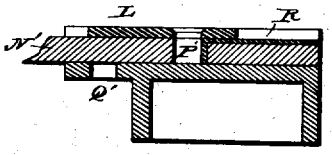

In Fig. 22 I have shown more particularly the slide for receiving and discharging the powder. The slide N′ is actuated by the lever N, or by a simple bell-crank lever. This slide is moved in and out horizontally—first in to receive the powder as it descends through the tube K′, and then out to discharge it into the shell. The slide is very closely boxed in, so that there can be no leakage of powder. If it be found necessary to have a cut-off, it can be effected by a thin movable plate on the under side of the slide N′ closing the opening P′ and preventing it from discharging its contents; or the plate may be in the bottom of the box inclosing the slide.

Fig. 23 shows a transverse section of the slide, in which P′ is the opening in the slide which receives and contains the charge from the tube K′, standing just above it, and Q′ is where the charge is delivered into the shell, which stands at the moment just below. The opening P′ is made adjustable to suit the size of charge desired by means of the movable plate R′, which is bent downward into the opening and closely occupying one side. This plate may have a scale marked on it for the various loads and regulated by a set-screw, S′, Fig. 22.

In order that there may always be powder in the hopper, I have provided a gage so arranged that the operator can tell at a glance just how much powder is contained. An inside pivoted lid, U′, lies on top of the powder and descends as the powder is discharged. This lid has an indicator, T′, attached to it on the outside of the hopper and shows the gradual discharge of the powder. This may be accomplished without the indicator by having the hopper made of strong glass, or by having a slot down the side of a metal hopper in which glass is fixed, so that the powder may be seen as it descends. In this case the hopper may be round and flaring or jar-shaped. The lid may also be of glass, to afford light from above.

The shot are received from a hopper and discharged into the shell by the same kind of slide as N′, connected with the powder-receptacle, and, if necessary, the same kind of a cut-off mechanism. The hopper itself is of peculiar construction. In order to relieve the heavy weight of the shot, a sloping bottom, V′, is employed, which throws the shot toward the small opening W′, which lets them into the narrow chamber X′, where they rest upon the slide and roll into the opening whenever presented. To make a perfect separation and prevent the shot from becoming choked and mutilated, there is a thin-pointed steel-blade spring, Y′, that rests down on the slide, and, as the slide is drawn out, cuts through between the shot for the charge and that to remain.

There is also a shot-gage for this hopper, which consists simply of a sheet-iron plate resting upon the shot, and sinks as the shot descends. A rod or narrow board is fastened to it, and, reaching up through the lid, makes the descent perceptible to the eye. Glass may also be used, as described, for the powder-hopper.

The shell having been charged with powder, it is whirled to the felt-wad cutter and placer. There are two wad-cutters—one for cutting and placing the felt wad on the powder and the other for cutting and placing the pasteboard wad on the shot. Wad cutters and placers have been used for the filling of cartridge-shells in which by a single stroke the wad may be cut and carried down into the shell. In this case, however, the rammer is simply a punch which performs the double work of cutting and placing. While this is simple it is defective, in that it will not admit of the wad being cut larger than the diameter of the shell. It is also well known that when the wad is cut of the exact diameter of the shell, or (as is generally the case) just a little less than the diameter, the wads soon work loose and the charge is liable to work out. In my device, while the cutting and placing are accomplished by the single stroke of a common lever, the cutter and rammer are separate, and each has a movement of its own. The cutter is a steel tube, inside of which a solid rammer plays up and down. This steel tube cuts the wad, then stops, while the rammer, moving on, carries it down into the shell. By this adjustment the wad may be cut larger than the internal diameter of the shell, and by the rammer being slightly smaller, with the aid of the beveled top of the shell-case, may be compressed tightly into the shell. A narrow strip of felt or pasteboard, unrolled from a reel suspended from above, is passed between the rollers $A^2$, by which it is carried under the cutter $B^2$. These rollers must move while the cutter is raised and the passage is cleared. This is effected by means of a saw-toothed flange, $C^2$, on the under side and running around near the edge of the revolving table A. There are eight of these saw-teeth, one for each movement of the table. The side of these teeth which gives movement to the rollers is very gradual in its slope, so as not to give too quick and sudden a motion to the rollers, thus causing them to slip on the material which they are feeding. These teeth throw down the lever $D^2$, which is of bell-crank form and connected with the ratchet on the rollers by the rod or link $E^2$. The lever is thrown up again, (so throwing back the ratchet to take a new hold,) after it has passed the point of the teeth, by means of a spring, as $F^2$. In order to adjust the throw of the rollers or the feed of the strips, the link $E^2$ is attached to the sleeve $G^2$, which is moved up and down by nuts placed on either side, thus increasing or decreasing the leverage of lever $D^2$. The rammer $H^2$ having completed its downward stroke, the wad is placed in the shell.

The operating device is attached to lever N at point $I^2$, Fig. 26. In the front view, Fig. 27, of the wad cutter and placer there is shown the face of the rollers $A^2$, (which may be smooth, corrugated, or toothed,) the arms $J^2$, which connect with the cutter $B^2$, and their relation on either side with the rammer $H^2$. In the sectional side view, Fig. 28, the passage $K^2$, through which the wad-strip passes, is now closed by the descent of the cutter and rammer. The strip passes in at the right and the refuse passes out at the left. The die-plate $L^2$ contains a circular opening, into which the cutter closely fits, cutting the wad in its downward passage. This plate is preferably of bell-metal, to avoid steel coming against steel and striking fire, and yet at the same time presenting a hard knife-like edge against which to cut. The relation of the cutter $B^2$ and rammer $H^2$ is here fully shown, the rammer being inside the cutter. In operation they start together above the opening $K^2$, the rammer being drawn up inside the center, say, half an inch. They descend in that way until the cutter has passed through the wad-strip, when it stops, as shown, at the bottom of plate $L^2$. The rammer continues on, carrying the cut wad into the shell, and returns. When the rammer is again within the cutter, both rise together. This compound movement is effected by means of a cam and mechanism connected therewith as follows: It will be seen that the rammer is attached directly to lever N at point $I^2$, and has a continuous movement throughout the stroke of the lever. The upper part of the rammer is flattened and contains a cam-slot, $M^2$. In this slotted cam plays a roller, $N^2$, attached to two cogged segments, $O^2$, one on either side of the rammer. These cogged segments fit, one each, into the cogged heads of the arms $J^2$, which, as before described, connect with and operate the cutter $B^2$. It is therefore evident that when $H^2$ begins to descend it will move, by means of its cam $M^2$, the segment $O^2$, which will cause the cutter $B^2$ to descend a certain distance, and then be stopped and held in its position by the perpendicular portion of the slot until the cam portion returns to carry it up. The cutter may be made square at the end, and be used as a punch for the pasteboard wads, or may have a chisel-shaped edge for the felt strip.

After the last wad has been placed above the shot, as described, it is necessary to hold the wads and charge in place. Ordinarily this is done by "crimping" the shells; but I use an indenting device and indent the shells just over the upper wad. The wad having been placed upon the shot, the case and shell are turned to the indenter, which is shown in Figs. 29 and 30. It is provided with a rammer for compressing the load after the last wad has been placed, and with means for making indentations at the moment when the greatest pressure is being exerted by the rammer. $P^2$ is said rammer, and $Q^2$ one of the indenters, there being two or more, but preferably three.

The rammer, with the indenters out, descends to the full length of its stroke, where it remains until the indenters are driven into the side of the shell and withdrawn, when all are again raised. This compound movement is all produced by the single stroke of a lever, N, attached at $R^2$, and by means of the same cog and cam arrangement just described in connection with the wad cutter and placer, only in this instance there is a reversal of the parts. The lever N takes hold of the arms $S^2$, which have flattened heads containing the cams, by which the cogged segment is moved a certain distance and then arrested, and so operating the rammer $P^2$ by means of the gearing before described.

The indenters $Q^2$ are preferably pointed and triangular in shape, as in Fig. 31, so that the indentations left in the shell are triangular and pyramidal in shape, their bases being cut out and pushed in over the wad, as described and claimed by me in Letters Patent No. 299,162. At the end of the rammer there are depressions in the sides to accommodate these indentations, as indicated in Figs. 29 and 30. These indenters, instead of being pointed and triangular, may be rounding, as shown in Fig. 32, providing they have a sharpened projecting edge for cutting the base of the indentations and pushing them in over the wad. In this instance the rounded indenters form interior convex indentations, the arc-shaped base being cut away and pressed inward. These indenting-points are made adjustable by nut and screw, as $T^2$, to accommodate the wearing to which they are subject. They are driven in and out by means of sliding bars $U^2$, having a slanting projection which plays up and down in slots cut in the head-pieces, in which the indenters are set, and acting on the principle of a cam. These sliding bars $U^2$ are supported by and have bearings in the arms $V^2$, which are firmly attached to the rammer $P^2$, moving up and down with it and remaining stationary with it. The bars $U^2$ are connected with the head-piece $W^2$, which is a movable sleeve around the rammer $P^2$, and is operated by the arms $S^2$, as described.

The shells stand on the upper plate of cases containing coiled springs X, Figs. 7 and 8, the plate being exactly the size of the butt of the shell, so that the shell yields as the rammer bears down. The pressure exerted may be regulated and the devices be made self-adjusting to various loads. This is accomplished by means of the springs X pressing against a movable plate, Y, and are adjustable in their tension from beneath by the set-screw Z. These cases are set in the stationary table B, the plate Y being brought on a level with the surface of the table. After the shell has been filled and fastened, it is turned to the last device in the series—viz., the extractor—where it is pushed out of the case into a receptacle below the table. Such a device is shown in side view Fig. 33. This device, however, performs a threefold function, for it also prints on the pasteboard wad the initial of the loading company and the designation of the load, so that a gunner, by picking up a shell, can see whether it is the particular make he wants, as well as the size of the shot—buck, duck, quail, &c. Again, it serves to seize and hold the revolving table in exactly the right place for all the cases to be entered by the various filling devices consequent upon the rollers R not always tightly and firmly embracing the flange P, (see Fig. 5,) and by the tendency of the revolving table to rebound when suddenly stopped. The actuating mechanism is attached to a radiating lever at $X^2$. The shell is driven downward out of the case by the rod $Y^2$, there being an opening in the stationary table B, through which it passes into a box below. This rod $Y^2$, in pushing out the shell, presses down upon the pasteboard wad. The lower end is therefore provided with a die, as $Z^2$, which contains the designating letters and figures before mentioned. This die, by means of a screw shown at the bottom, can be removed and replaced by another as often as there is a change in the loading. For instance, a thousand shells containing No. 4 shot may be filled.

When No. 8 shot shells are to be filled, it will simply be necessary to put in that particular die, and so on for each particular number. To keep this die inked, an ink-pot, $A^3$, is provided, which has a narrow neck, $B^3$, with a small opening through the center to conduct the ink to the cup $C^3$, containing an ink-pad. This ink-pot is pivoted at $D^3$. Now, as the rod $Y^2$ nears the top of its stroke, the upper part of the ink-pot is tilted backward and downward until the ink-pad is thrown up against the die $Z^2$. This is the limit of the stroke. The instant the rod $Y^2$ starts downward the ink-pot is swung upward, causing the ink-pad to move from under $Z^2$ and out of the way. This is accomplished by its connection with lever $E^3$, which is directly employed to throw in and out the clutch $F^3$. The coil-spring $G^3$ is used to relieve the sudden and hard pressure of the ink-pad. The lever $E^3$ is operated by the cam $H^3$, similar in form to that shown in the wad-cutters and the indenters. It will be seen that the moment the downward stroke is begun the lever $E^3$ throws in the clutch $F^3$, and then remains stationary until the return-stroke is nearly completed, when it flies back, the clutch is withdrawn, and the revolving table is permitted to move. The lever $E^3$ may work directly in the cam $H^3$; but the combination of links $I^3$ and $J^3$ is added to give ease to the movement.

In Fig. 34 we have a top view of a part of the clutch $F^3$, showing the manner in which it embraces and clamps the shell-case C with the curved prongs $K^3$. The clutch $F^3$ is adjustable by a screw taking hold of the pivot $L^3$, so that as the prongs wear away they can be moved forward, so keeping them tightly pressed against the case C when they are thrown in. This clutch $F^3$ may be dispensed with if the device for rotating the table A is employed, as set forth in Figs. 9 and 13.

In case the machine is used for loading ball-cartridges, the shot-filler and pasteboard-wad cutter may be dispensed with. If the shells are of metal, the indenter may also be dispensed with. In this case a device such as shown in Fig. 35 will be used for filling and compressing the balls. In this device, $M^3$ is the tube containing the balls. $N^3$ is the rammer for pressing the balls into the shells, and is connected with the lever N at $O^3$. A link, $P^3$, is connected with a slide similar to that shown in the shot and powder loaders. The opening in this need not be adjustable, but just large enough to receive one ball at a time. This slide receives into its opening a ball, and then is moved forward until the ball is directly under the rammer $N^3$, and just in time to be caught by it and carried down into the shell, which stands in line underneath. This movement is effected through the link $P^3$, connecting with the swinging arm $Q^3$, which contains a cam-slot, $R^3$, in which moves the pin $S^3$, projecting from the rammer $N^3$. As the rammer rises, and when near the top of its stroke, the slide is moved back to receive a ball. The instant the rammer starts downward the slide is thrown outward in time to bring the ball under it. The balls may be fed by hand into the tube $M^3$, or by belt similar to that described in connection with the capper, taking them from a hopper. If slugs are used, they may be sorted, and the proper ends turned foremost by gravity, like the shells on their way from the hopper to the placer.

Different means for rotating the movable table and operating the filling devices may be used than the ones particularly claimed. I may use radiating levers N, Fig. 1, attached to the central shaft, said levers being supported by a secondary table, H, secured to or supported by the stationary table B by means of feet I. I may also have a head-block, U, Fig. 4, the radiating arms of which connect directly with the devices; or the arms may support a rim, V, which may be connected by links above or below, as at W. Figs. 3, 5, and 9 show another form of cam-wheel, by means of which the revolving table may be operated. This wheel G has a flange, P, the spiral part Q of which causes the table to move, being placed opposite that part of the cam which holds the filling devices in suspense.

R, Figs. 2 and 6, are teeth or rollers bolted to the circular plate F, secured to the bottom of shaft G. These rollers are placed in pairs, (eight pairs in all,) the distance between them being equal to the width or thickness of the flange. The flange throws off one pair of these rollers at S, Fig. 5, and takes on another pair at T. The spiral portion of the flange is made tapering toward the end, necessitated by its diagonal direction and the swinging to one side of the pair of rollers as the circular plate F turns on its center. The cam-wheel D is driven by any suitable pulley, and accomplishes the double purpose of operating the filling devices and turning the revolving table. It first operates the devices, and then holds their movable parts suspended while it turns the table one-eighth of its revolution, or far enough to move a given case from one filling device to another. The first effect is accomplished by means of lifting and lowering a perpendicular shaft, M, which at the top is connected with levers N, radiating to the various filling devices. The next effect is accomplished by means of the spiral flange passing between the teeth or rollers on the hollow shaft G, before referred to. This shaft G is secured to and moves with table B, and is made hollow for the passage of the shaft M. In Fig. 3, K is a wheel working in cam J, and is connected by an arm, L, with shaft M. This shaft is bent inward at O and thrown forward by the arm L, in order to bring it into the center of hollow shaft G, which is forward and nearly in line with the edge of the cam-wheel, so that the movement of shaft M will be vertical and positive. It is evident that other forms of cam-wheels, shafts, and levers may be used for operating the filling devices without departing from the spirit of my invention.

It must be remembered that these various actions are continuous, automatic, and rapid. One person can take charge of a machine, it only being necessary to see that the various hoppers and wad-strips are kept supplied.

Having thus described my invention, what I claim as new, and desire to secure by Letters Patent, is—

1. In a cartridge-loading machine, the combination, with a movable table and means for actuating the same, of a stationary table supporting the shell-filling devices and provided with an opening for the passage of the shell to a shell-holder, an incline to force the shell up as the case is moved forward, and spring-catches to hold the shell in place until the case is moved away from the opening in the table, as set forth.

2. In a cartridge-loading machine, the combination, with a rotating table carrying a series of shell-holders, of a stationary table having adjustable plates supporting the shell as it stands under the indenter and the wad cutters and placers, said plates being vertically adjustable, whereby the pressure upon the shells may be regulated while the loads are being compressed, as set forth.

3. In a cartridge-loading machine, the combination, with a stationary table provided with adjustable plates for supporting the shells while under the indenter, wad-cutter, and rammer, of a revolving table and mechanism for moving it within the stationary table, and a series of shell-holding cases secured to said movable table, said cases being open at top and bottom and extending over the stationary table as a base beneath the filling devices and over openings in the table to serve as passages to and from the cases, as set forth.

4. In a cartridge-loading machine, the combination, with the shell-indenting mechanism automatically actuated, of a series of shell-holding cases secured to a revolving table and carried thereby, said cases having slots for the passage of the indenters, said indenters passing through the slots and body of the shell, as and for the purposes set forth.

5. The combination, with the filling mechanism and a shell-feeder, of a shell placer consisting of a pivoted pocket normally opened toward the shell-feeder and turning into line with the shell-holding case, and provided with a bolt or piston to force the shell into the shell-case, as set forth.

6. In a cartridge-loading machine, the combination, with the table, of a hollow shaft, the upper end of which is secured to the rotating table, a solid shaft passing through the hollow one and connected at its upper end with the filling devices on the stationary table, a cam-wheel connected to and intermittently rotating the hollow shaft, and having also a cam-connection with the solid shaft, whereby the latter is longitudinally reciprocated, said connections being so arranged that the movement of the shaft will alternate, the hollow shaft intermittently rotating the movable table to carry a given cartridge-shell from one filling device to the next in the series, the solid shaft in turn actuating the said filling devices, as set forth.

7. In a cartridge-loading machine, the combination, with a stationary table supporting the filling devices, of a movable table, a hollow shaft connected thereto, a solid shaft reciprocating through the hollow shaft and actuating the filling devices, a reciprocating sliding frame connected to and rotating the movable table, a flanged cam-wheel imparting motion to the reciprocating frame and to the solid shaft, and a motor for actuating said cam-wheel, as and for the purpose set forth.

8. The combination, with the stationary table supporting the filling devices, of a movable table carrying the shell-holders, a shaft connected to the filling mechanism, a shaft connected to the movable table, and a wheel, *h*, for actuating the same, a slotted sliding frame provided with anti-friction rollers, which engage a series of flanges on wheel *h* to operate the same intermittently, and a spirally-flanged wheel actuating the solid shaft and sliding frame, whereby the filling devices are first operated and then held until the table is turned far enough to move a given cartridge-case from one filling device to the next in the series, as set forth.

9. The combination, with a stationary table supporting the filling devices, a rotating table carrying the shell-holders, and the shafts connected to said rotating table and filling devices, of a single spirally-flanged cam-wheel connected with the shaft, which actuates all the filling devices, as set forth.

10. In a cartridge-loading machine, the combination, with the stationary table supporting the filling devices, of the movable table, a hollow shaft secured thereto, a wheel for actuating said shaft, said wheel having grooves, as described, a reciprocating sliding frame having anti-friction rollers and imparting motion to the grooved wheel through the intervention of a pivoted arm having a roller engaging the grooves, and a flanged cam-wheel engaging the friction-rollers and imparting motion to the sliding frame and to a solid shaft connected to the filling devices, whereby the shafts are intermittently and independently actuated and the rotating table intermittently turned and held in position, as and for the purpose set forth.

11. The combination, with the movable table and shell-holders and the stationary table having an opening for the passage of the shells, of a shell-placer swinging on a pivot in a perpendicular direction and provided with a bolt to force the shell from the pocket into a shell-holding case, as set forth.

12. In a cartridge-loading machine, the combination, with a cam-slotted lever of a pivoted shell-placer provided with a bolt or piston actuated by the movement of said lever to force the shell into a holding-case, the upward movement causing the pocket to turn into a vertical position and be held in said position until the bolt is operated, as set forth.

13. The combination, with the shell-supply tube, of the automatically-operated shell-placer and actuating mechanism therefor, said placer having a flange or cut-off attached to and moving therewith, which closes the bottom of the feed-tube and cuts off the supply when the placer swings out of alignment therewith, as set forth.

14. In a cartridge-loading machine, the combination, with the filling devices and actuating mechanism therefor, of a pivoted shell-placer inclined to the shell-feeder to receive the shells, said placer being actuated by a cam-slotted lever operated by the central shaft, the upward movement of the lever causing the placer to be raised to an opening leading to the shell-carrier and forcing the shell therein, the downward movement of said lever returning the placer and the piston to their former positions, as set forth.

15. In a shell-feeder for cartridge-loading machines, the combination, with a hopper, of an endless belt on the bottom thereof, and a narrow descending trough at the end of the belt, said trough having one or more openings of less width than the length of a shell, whereby the shells are caused to fall butt first into said openings and pass to the shell-placer with the butts presented to the opening in the placer, as set forth.

16. In a capper for cartridge-loading machines, the combination, with the stationary table, of a cap-receiving tube, B′, set loosely therein and having a vertical movement, a die on the top of said tube, and a cap-seating plunger reciprocating in such tube, and also pressing upward the same to impress indicating letters or figures on the base of the shell, as set forth.

17. In a cartridge-loading device, the combination, with the cap-placing mechanism, of a cap-feeder consisting of a trough, the upper end having two channels to receive the caps from the belt or hopper and entering the main tube in opposite directions, said trough having a twist in the passage, whereby the caps are caused to turn over on their solid ends as they enter the placing-tube, as set forth.

18. The combination, with the central shaft and actuating mechanism therefor, of a wad cutter and placer consisting of a tubular cutter and an interior and separate rammer, said rammer passing through the cutter, as set forth.

19. The combination, with the central shaft and actuating mechanism, of a wad cutter and placer consisting of a tubular cutter actuated by a cam on the rammer and an interior rammer passing through the cutter and actuated directly by the central shaft, as set forth.

20. In a shot-filling device for cartridge-loading machines, the combination, with a movable slide intermittently actuated by a lever connected with the central operating-shaft, of a hopper having a sloping bottom provided with an opening leading to said slide, the slide having a spring-blade resting thereon to cut through the shot as the slide is moved in and out, as set forth.

21. The combination, with the central shaft and actuating mechanism therefor and wad-strip, of a tubular cutter and a solid rammer passing through the cutter, said rammer being attached to and actuated directly by the central shaft, said cutter being actuated by a cam on the rammer, whereby the cutter is carried through the wad-strip and then held in position while the rammer passes through said cutter and presses the wad into the shell, as set forth.

22. In a wad cutter and placer, the combination, with the central shaft, of a slotted cam intermittently actuated by the shaft, a tubular cutter and separate rammer, the upper part of said rammer containing a cam, a roller, and two cogged segments, one on each side of the rammer and engaging with arms to operate the cutter, the segments and cam causing the cutter to descend until the cam reaches the perpendicular portion of the slot, and then held in position until the rammer completes its movement, as set forth.

23. The combination, with the central shaft, actuating mechanism therefor, and wad-feeding mechanism, of a tubular cutter, solid rammer, and die interposed between the wad-strip and shell, said cutter and rammer descending together through the wad-strip, the rammer passing through the die on the downstroke of the actuating-cam, the upstroke of said cam raising both cutter and rammer to their normal position, as set forth.

24. In a wad-feeder for cartridge-loading machines, the combination, with the wad-strip, wad-cutter, and actuating mechanism therefor, of the feed-rollers $A^2$, lever $D^2$, and link $E^2$, connecting said lever with a ratchet on the rollers, said rollers being actuated by a toothed flange on the under side of the revolving table, as set forth.

25. In a cartridge-loading machine, the combination of the wad-cutter and reciprocating rammer actuated by a cam, $M^2$, a die-plate through which the rammer and cutter pass, with feed-wheels for feeding the wad-strip, said wheels being actuated by a link, $E^2$, through the intervention of a lever, $D^2$, connected therewith by an adjustable sleeve, whereby the feed of the strip is regulated, said lever being actuated by a toothed flange on the under side of the movable table, as and for the purpose set forth.

26. In a cartridge-loading machine, the combination, with a wad-rammer and its actuating mechanism, of sliding bars having bearings in arms attached to and moving with said rammer, and indenting-points for cutting the sides of the shell and pressing the base over the wad, said indenters being driven in and out by the sliding bars, as and for the purpose set forth.

27. In a cartridge-loading machine, the combination, with the shell-indenters, of the sliding bars $U^2$, moving in slots in a movable head-piece or sleeve on the rammer and operated by arms $S^2$, said sliding bars supported by bearings $V^2$, attached to and moving with the rammer, as set forth.

28. In a cartridge-loading machine, the combination, with the rotating table, shell-filling mechanism, and an ejecting-rod for automatically forcing the shell from the holders, said rod having a die on its lower end, of an inking mechanism actuated simultaneously with the movements of the ejecting-rod, as set forth.

In testimony whereof I affix my signature in presence of two witnesses.

G. MOORE PETERS.

Witnesses:
A. M. BERKLEY,
F. C. TUTTLE.